P. DENNIS.
Potato-Digger.

No. 16,722.

Patented Mar. 3, 1857.

UNITED STATES PATENT OFFICE.

PAUL DENNIS, OF STILLWATER, NEW YORK.

IMPROVEMENT IN POTATO-DIGGERS.

Specification forming part of Letters Patent No. 16,722, dated March 3, 1857.

*To all whom it may concern:*

Be it known that I, PAUL DENNIS, of Stillwater, in the county of Saratoga and State of New York, have invented a new and useful Improvement in Potato-Diggers; and I do hereby declare that the following is a full, clear, and exact description of the same, reference being had to the accompanying drawings, forming part of this specification, in which—

Figure 1:
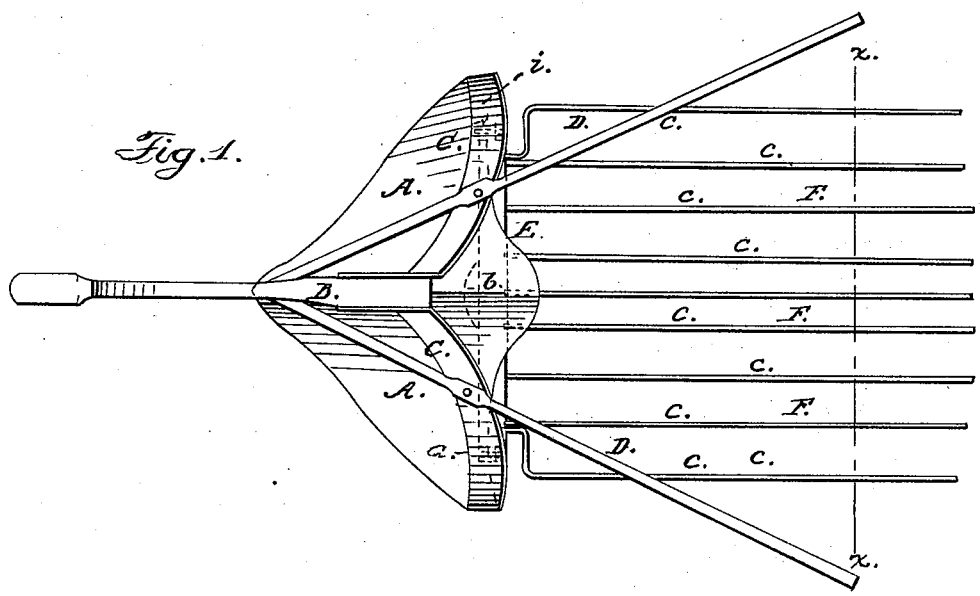
Figure 2:
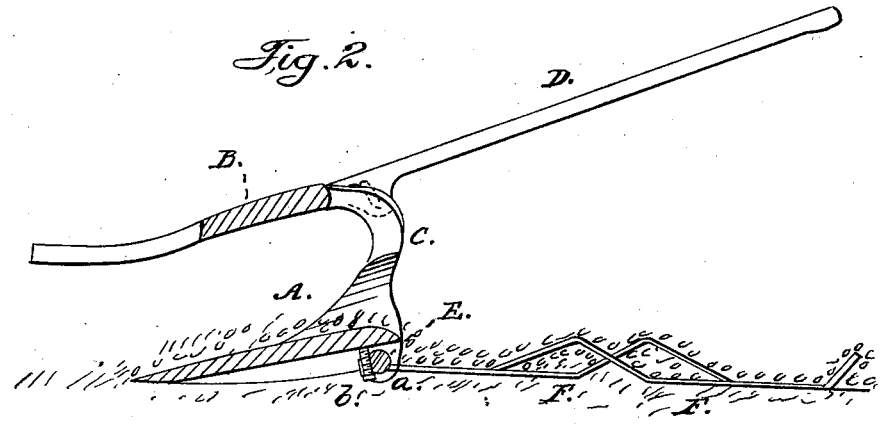

Figure 1 is a plan of a potato-digger constructed with my improvement. Fig. 2 is a vertical longitudinal section of the same.

Similar letters of reference in each of the several figures indicate corresponding parts.

My invention consists in the employment or use of a digger, in combination with a separator, constructed in a peculiar manner, as will be hereinafter fully shown and described.

To enable others skilled in the art to make and use my invention, I will proceed to describe its construction and operation.

A is an ordinary double-mold-board digger attached to a plow-beam, B, by curved standards C C, as shown. D D are the handles of the plow.

E is a shaft arranged transversely under the rear part of the digger in bearings $a$ $a$, in which it is capable of turning freely in an upward direction when the digger is operating. $b$ is a set-screw for adjusting the separator and preventing it from turning downward when the digger is operating. In this shaft the separator-bars F F are secured firmly in a position to rest upon the ground when the digger is operating.

By examining the drawings it will be seen that the separator-bars are arranged so as to form a concave receptacle for the dirt and potatoes to fall into, and each is provided with a conical stop or elevator, $c$, on its upper side, said stops being arranged alternately out of line with one another, so as to form an irregular undulating surface for the potatoes and dirt to pass over, as illustrated. It is by having the separator capable of turning at its forward end on the shaft E that the advantage of having it capable of adjusting itself to any adjustment which may be given to the point of the digger in passing over stones or other obstacles is secured; and it is by thus having the separator capable of turning and providing the set-screw $b$ that the advantage of having it capable of being adjusted to suit any depth at which it may be desired to have the digger enter the soil is obtained; and, further, it is by having the stops or elevations of the separator-bars arranged alternately out of line with one another and the bars to run directly upon the soil that a thorough separation of the potatoes from the dirt is effected, for after the potatoes come upon the separator they roll some distance over the plane portion of the separator, and in doing so the greater portion of the dirt which adhered to them in passing from the digger is stripped from them, owing to its coming directly in contact and mixing with or adhering to the soil or ground under the separator, as illustrated in Fig. 2, and by the time the potatoes arrive at the stops or elevations and pass over the same and over the terminating plane portion of the separator, in the manner illustrated in Fig. 2, the remaining portion of the dirt is stripped off and thoroughly separated from the potatoes.

What I claim as my invention, and desire to secure by Letters Patent, is—

In combination with the digger A, the manner herein described and shown of constructing the separator so as to form an irregular undulating surface for the potatoes to fall upon, for the purpose set forth.

PAUL DENNIS.

Witnesses:
J. R. McGREGOR,
CHARLES MOORE.